GEORGE A. DAVIDSON.
Improvement in Stone-Truck.

No. 127,744.    Patented June 11, 1872.

Witnesses:
A. Bennersendorf.
W. A. Graham.

Inventor:
Geo. A. Davidson,
per Munn & Co.
Attorneys.

127,744

UNITED STATES PATENT OFFICE.

GEORGE A. DAVIDSON, OF MALDEN, ASSIGNOR TO HIMSELF AND HORACE T. CASWELL, OF TROY, NEW YORK.

IMPROVEMENT IN STONE-TRUCKS.

Specification forming part of Letters Patent No. 127,744, dated June 11, 1872.

Specification describing a new and Improved Stone-Truck, invented by GEORGE A. DAVIDSON, of Malden, in the county of Ulster and State of New York.

My invention consists of a detachable connection of the front end of the platform of the common two-wheeled hand-trucks used in stone-yards to a front truck with gear for readily hitching thills to it and unhitching them, whereby I have all the advantages of a hand-truck combined with a horse-truck, so that the loading of large flat stones standing on end in the yard on the truck by tilting the rear end of the platform down to the foot of the stone, throwing the stone over on to it, and then tilting the stone and platform back on the wheels, may be performed in the same way with the horse-truck that it is done by the hand machine by simply detaching the platform from the front truck for this purpose, and then connecting it again with the said front truck.

Figure 1:
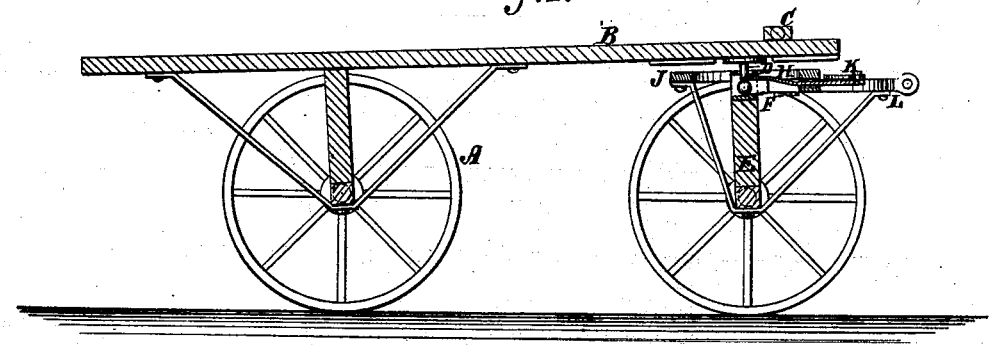
Figure 2:
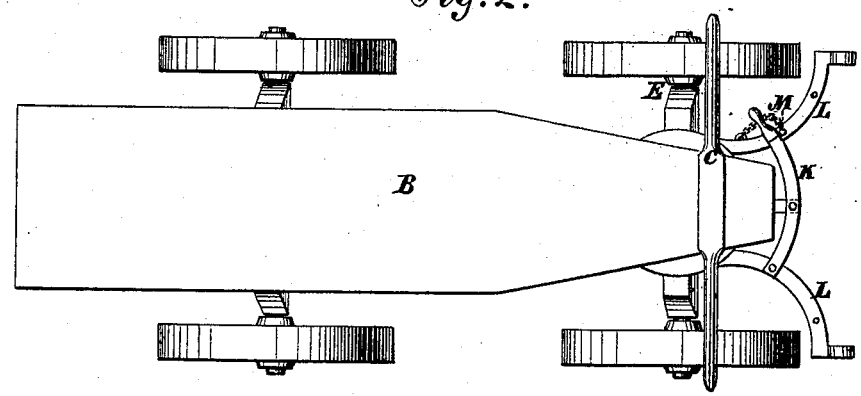
Figures 3, 5:
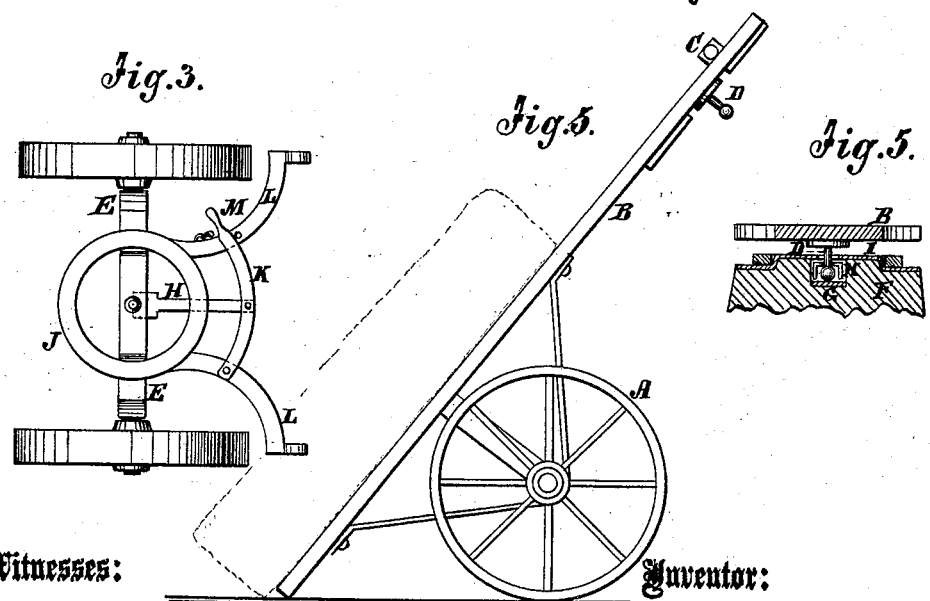

Figure 1 is a longitudinal sectional elevation of my improved truck. Fig. 2 is a plan view. Fig. 3 is a plan view of the front truck disconnected from the other. Fig. 4 is a side elevation of the ordinary hand-truck, showing the manner of loading it, and Fig. 5 is a section on the line $x$ $x$ of Fig. 2.

Similar letters of reference indicate corresponding parts.

The pair of wheels A and the platform B, with the handles C, represent the common hand-trucks in use in stone-yards and the like for loading heavy weights of the character shown in Fig. 2, in the manner therein indicated. To the lower side of this platform and near the front end, I attach a strong-headed pin, D, for connecting to a front truck, E, by dropping into a hole, F, upon a steel-plate, G, where it is secured by the notched or forked end of a bar, H, sliding in against the pin above the head and under the plate I on the top of the axle, said bar being connected to the hand-truck mounted on the hounds L, as shown, and fastened in either position by a pin, M. The hounds of this truck are so constructed with eyes or bolts that the thills in which a horse may be kept constantly harnessed may be readily connected or disconnected for shifting the truck about for loading, &c. This, together with the ready means of connecting or disconnecting the hand-trucks with the front one, constitutes a very useful and handy machine for use in stone-yards. Care is taken to have the platform B stand high enough above the fifth-wheel J to allow of the vertical oscillation of the axle without cramping.

Having thus described my invention, I claim as new and desire to secure by Letters Patent—

The detachable connection of the hand-truck A B C to the front truck by means of the headed pin D rigidly fastened to the platform B, the socket E in the axle, and the notched locking-bar H, the said pin resting on a steel or other hard wearing-plate, G, all substantially as specified.

GEORGE A. DAVIDSON.

Witnesses:
  B. M. FIELIGH,
  WM. H. ECKERT.